(12) United States Patent
Harland et al.

(10) Patent No.: US 10,996,969 B1
(45) Date of Patent: May 4, 2021

(54) CONTROLLING ACCESS BY A NETWORK INTERFACE

(71) Applicant: Amazon Technologies, Inc., Seattle, WA (US)

(72) Inventors: Jason Alexander Harland, Seattle, WA (US); Matthew Shawn Wilson, Bainbridge Island, WA (US); Anthony Nicholas Liguori, Bainbridge Island, WA (US); Erez Tsidon, Moreshet (IL)

(73) Assignee: Amazon Technologies, Inc., Seattle, WA (US)

( * ) Notice: Subject to any disclaimer, the term of this patent is extended or adjusted under 35 U.S.C. 154(b) by 318 days.

(21) Appl. No.: 15/825,068

(22) Filed: Nov. 28, 2017

(51) Int. Cl.
*G06F 9/455* (2018.01)
*G06F 13/42* (2006.01)
*G06F 13/10* (2006.01)

(52) U.S. Cl.
CPC ........ *G06F 9/45558* (2013.01); *G06F 13/105* (2013.01); *G06F 13/4221* (2013.01); *G06F 2009/45579* (2013.01); *G06F 2009/45583* (2013.01); *G06F 2009/45587* (2013.01); *G06F 2009/45595* (2013.01)

(58) Field of Classification Search
CPC ....... G06F 9/45558; G06F 2009/45595; G06F 2009/45587; G06F 2009/45579
USPC .......................................................... 726/27
See application file for complete search history.

(56) References Cited

U.S. PATENT DOCUMENTS

| 5,859,911 | A  | * | 1/1999 | Angelo | G06F 12/1408 |
| | | | | | 711/E12.092 |
| 6,185,678 | B1 | * | 2/2001 | Arbaugh | G06F 21/575 |
| | | | | | 713/2 |
| 8,321,931 | B2 | * | 11/2012 | Zimmer | G06F 21/575 |
| | | | | | 726/21 |
| 2007/0092082 | A1 | * | 4/2007 | Rush | G06F 21/10 |
| | | | | | 380/277 |
| 2007/0094507 | A1 | * | 4/2007 | Rush | H04L 63/123 |
| | | | | | 713/176 |
| 2008/0147555 | A1 | * | 6/2008 | Cromer | G06F 21/10 |
| | | | | | 705/52 |
| 2009/0144472 | A1 | * | 6/2009 | Montgomery | G06F 21/85 |
| | | | | | 710/261 |
| 2009/0249053 | A1 | * | 10/2009 | Zimmer | G06F 21/575 |
| | | | | | 713/2 |

(Continued)

*Primary Examiner* — Teshome Hailu
(74) *Attorney, Agent, or Firm* — Klarquist Sparkman, LLP (57) ABSTRACT

A server computer toggles between a protected mode and an unprotected mode. In the protected mode, users are unable to access configuration information due to a Base Address Register (BAR) being cleared. However, a service provider can access a Trusted Platform Module (TPM) through an Application Program Interface (API) request. In an unprotected mode, the BAR is programmed so that users can access the configuration information, but the TPM is blocked. Blocking of the TPM is achieved by changing a configuration file, which changes an overall image of the card. With the modified image not matching an original image, the TPM blocks access to data, such as encryption keys. Separate interfaces can be used for user access (PCIe) and service provider access (Ethernet) to the server computer. The server computer can then be toggled back to the protected mode by switching the configuration file to the original configuration file.

19 Claims, 7 Drawing Sheets

(56) References Cited

U.S. PATENT DOCUMENTS

2016/0098365 A1* 4/2016 Bshara ................ G06F 13/105
                                                                                  710/104

\* cited by examiner

CONTROLLING ACCESS BY A NETWORK INTERFACE

BACKGROUND

Cloud computing is the use of computing resources (hardware and software) which are available in a remote location and accessible over a network, such as the Internet. Users are often able to buy these computing resources (including storage and computing power) as a utility on demand.

A cloud computing environment typically includes a plurality of server computers, each of which executes a hypervisor. The hypervisor includes management software executing on the server computers that creates and runs virtual machines. The hypervisor typically divides access to hardware on a server computer between the different virtual machines. The hypervisor also provides a layer of protection to block access to hardware on the server computer, if desired. However, in some applications, protections provided by the hypervisor are removed. In such a case, alternative types of protections should be implemented to prevent unwanted access to hardware on the server computer.

DETAILED DESCRIPTION

In embodiments described herein, a server computer toggles between a protected mode and an unprotected mode. In the protected mode, users are unable to access configuration information due to a Base Address Register (BAR) being cleared. However, in the protected mode, a compute service provider can access a secure area, such as a Trusted Platform Module (TPM), through an Application Program Interface (API) request. In an unprotected mode, the BAR is programmed so that users can access the configuration information, but the secure area is blocked. Blocking of the secure area is achieved by changing the configuration information, which changes an overall image of the server computer. With the modified image not matching an original image, the secure area blocks access to data, such as encryption keys. Separate interfaces can be used for user access (e.g., PCIe) and compute service provider access (e.g., Ethernet) to the server computer. The server computer can then be toggled back to the protected mode by switching the configuration information to the original configuration information and performing a reset. Hash values calculated on the original image will match stored values within the secure area ensuring that the secure area allows access to data stored therein. With the server computer in a protected mode, firmware updates, maintenance and/or debug can be performed by the compute service provider through the Ethernet interface.

Figure 1:
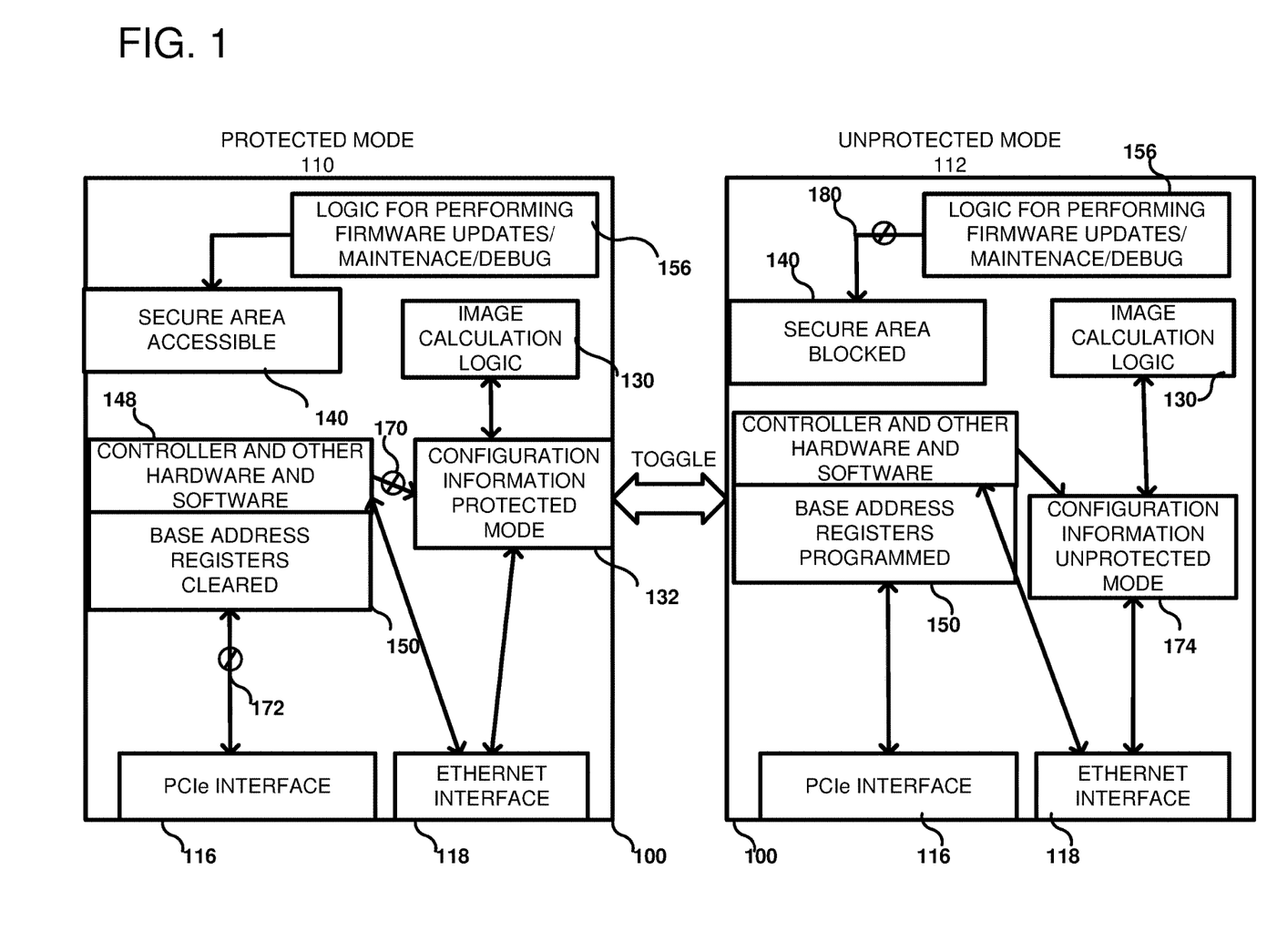
FIG. 1 illustrates a server computer that toggles between a protected mode and an unprotected mode.

FIG. 1 illustrates a server computer 100 (alternatively, 100 can be a card within a server computer) that can be toggled between a protected mode 110 and an unprotected mode 112. Although the same server computer 100 is shown on both the right and left side of FIG. 1, the components that are accessible differs between the modes 110, 112. The server computer 100 includes multiple interfaces including a PCIe interface 116 and an Ethernet interface 118. Although the PCIe interface 116 and the Ethernet interface 118 are shown, other interfaces can be used. Image calculation logic 130 together with configuration information 132 allow a change in configuration space data to block users running on the hardware from gathering information about the server computer, such as which Integrated Circuits (ICs) are being used, and from accessing encrypted data within a secure area 140, such as a TPM. In one embodiment, the secure area includes a secure crypto processor which can have a microcontroller designed to secure hardware by using keys that can be integrated into devices. Additionally, toggling to the unprotected mode 112 allows the information about the server computer to be available again so as to allow firmware updates, maintenance and debug to be implemented by the service provider (e.g., host) of a multi-tenant environment.

The server computer 100 can further include a controller and other associated hardware and software, shown generally at 148. Base Address Registers (BAR) 150 can be associated with the controller 148, which in this case is a PCIe controller. The server computer 100 can further include service provider logic 156 for performing firmware updates, maintenance, and debug. As indicated at 150, in the protected mode 110, the BARs 150 are cleared so that users of the multi-tenant environment are not able to access the configuration information in the protected mode as indicated by the not-available indicators 170 on arrows extending from the controller 148 to the configuration information 132. Thus, as shown at 172, the PCIe interface 116 is effectively blocked from accessing configuration information on the server computer 100, which prevents firmware updates to the server computer. However, during the protected mode, the logic 156 can receive instructions from the Ethernet interface 118 (either directly or indirectly through the controller 148, which is also coupled to the Ethernet interface) to perform firmware updates, maintenance, and/or debug. In some embodiments, the BARs 150 are only partially cleared so that some of the functionality of the server computer can still be available to the users through the PCIe interface. In one example, BAR 0 can be available, while BARs 4 and 5 are cleared.

In the unprotected mode 112, the Ethernet interface 118 can be used to change the configuration information to an unprotected mode, as indicated at 174. In the unprotected mode, logic controlled by the service provider, such as image calculation logic 130 or service provider logic 156, can program BARs 150 so as to allow users to access the configuration information using the PCIe interface so that the user can perform firmware updates. In the unprotected mode, the secure area 140 is not accessible to requests originating from the Ethernet interface 118. As explained further below, when the server computer 100 initially boots, the image calculation logic 130 performs a hash calculation on image data obtained from the hardware and software on the server computer 100. The image data includes the configuration information 132 associated with the protected mode. A hash value can then be stored within the secure area 140 indicating that the current image data allows access to keys such as encryption keys within the secure area. To switch modes, the service provider modifies the configure information 174 so as to indicate an unprotected mode using the Ethernet interface. A reset can then occur causing the image calculation logic 130 to perform a new hash calculation on the image data including the updated configuration information 174. Because the configuration information changed, the hash value generated by the image calculation logic 130 is different. When the new hash value is passed to the secure area 140, the secure area blocks access to data stored therein due to the mismatch between the hash value obtained in the protected mode and the hash value obtained in the unprotected mode. Thus, through a simple change in configuration information 132, 174 the service provider can toggle modes on the server computer 100 so as to switch between the protected mode 110 and the unprotected mode 112.

Communications from the Ethernet interface 118 can be in the form of network service requests generated by the service provider. Network services are commonly used in cloud computing. A network service is a software function provided at a network address over the web or the cloud. Clients initiate network service requests to servers and servers process the requests and return appropriate responses. The client network service requests are typically initiated using, for example, an API request. For purposes of simplicity, network service requests will be generally described below as API requests, but it is understood that other network service requests can be made. An API request is a programmatic interface to a defined request-response message system, typically expressed in JSON or XML, which is exposed via the web-most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a network service receives the API request from a client device or from the host computer, the network service can generate a response to the request and send the response to the endpoint identified in the request.

Through an API to the server computer 100, the service provider can switch between the protected mode, wherein the user is blocked from accessing configuration information that is accessible to the logic 156, and an unprotected mode, wherein the user can access the configuration information, but the secure area blocks all accesses from the service provider logic, as indicated at 180.

Figure 2:
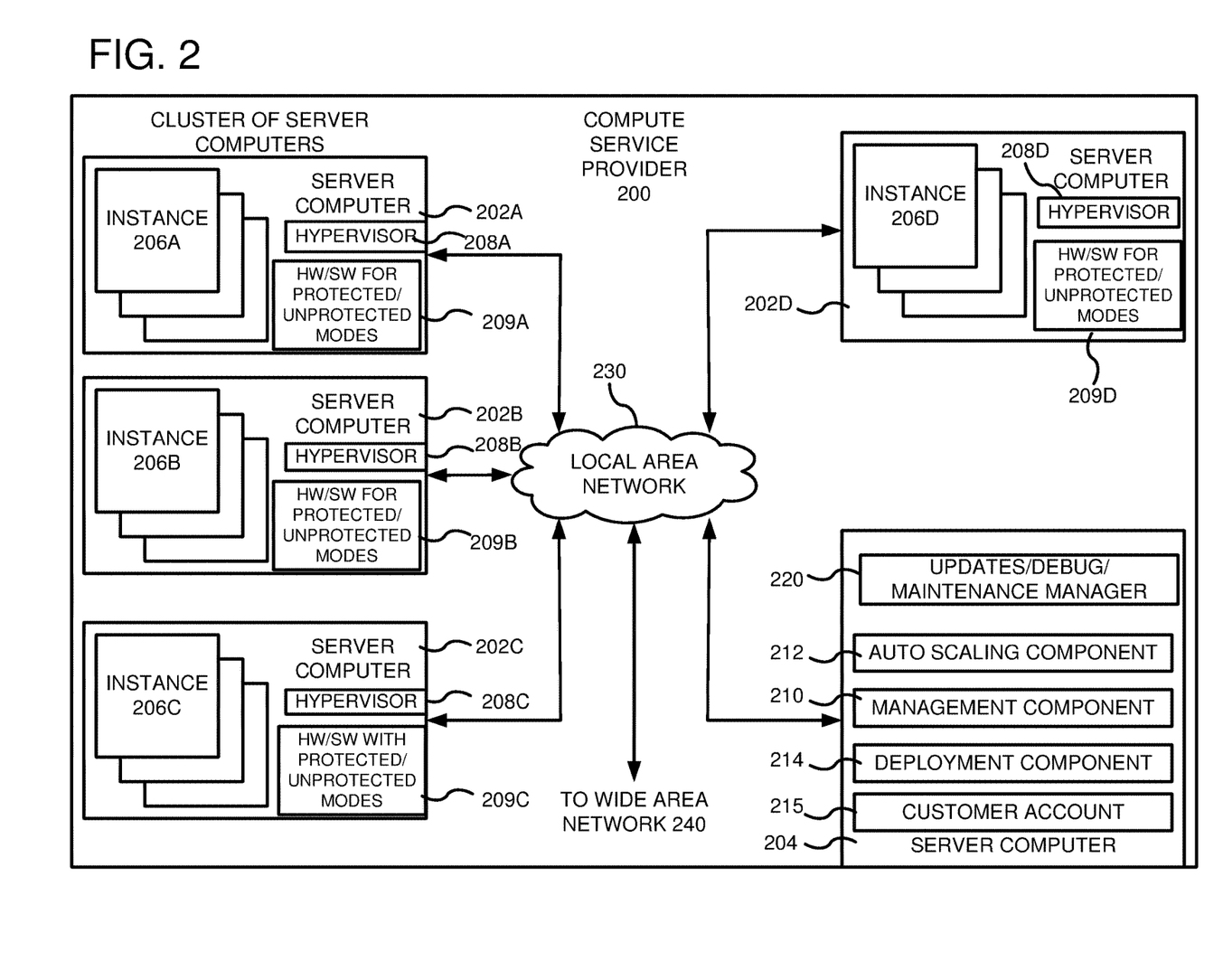
FIG. 2 is an example system diagram showing a plurality of virtual machine instances running in a multi-tenant environment, with local firmware on the server computer providing protection to hardware or software access.

FIG. 2 is a computing system diagram of a network-based compute service provider 200 that illustrates one environment in which embodiments described herein can be used. By way of background, the compute service provider 200 (i.e., the cloud provider) is capable of delivery of computing and storage capacity as a service to a community of end recipients. In an example embodiment, the compute service provider can be established for an organization by or on behalf of the organization. That is, the compute service provider 200 may offer a "private cloud environment." In another embodiment, the compute service provider 200 supports a multi-tenant environment, wherein a plurality of users operate independently (i.e., a public cloud environment). Generally speaking, the compute service provider 200 can provide the following models: Infrastructure as a Service ("IaaS"), Platform as a Service ("PaaS"), and/or Software as a Service ("SaaS"). Other models can be provided. For the IaaS model, the compute service provider 200 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 200 using networked client devices, such as desktop computers, laptops, tablets, smartphones, etc. running web browsers or other lightweight client applications. Those skilled in the art will recognize that the compute service provider 200 can be described as a "cloud" environment.

The particular illustrated compute service provider 200 includes a plurality of server computers 202A-202D. While only four server computers are shown, any number can be used, and large centers can include thousands of server computers. The server computers 202A-202D can provide computing resources for executing software instances 206A-206D. In one embodiment, the instances 206A-206D are virtual machines. As known in the art, a virtual machine is an instance of a software implementation of a machine (i.e. a computer) that executes applications like a physical machine. In the example of virtual machine, each of the servers 202A-202D can be configured to execute a hypervisor 208A-208D or another type of program configured to enable the execution of multiple instances 206 on a single server. Additionally, each of the instances 206 can be configured to execute one or more applications. The server computers 202A-D can further include hardware, software, firmware or combinations thereof (e.g., one or more cards having processors executing software) 209A-209D that can be toggled between a protected mode and unprotected mode. Additionally, the instance 206 can communicate with the hardware/software/firmware 209 through a PCIe interface, such as PCIe interface 116 (FIG. 1).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 204 can be reserved for executing software components for managing the operation of the server computers 202 and the instances 206. Thus, the compute service provider 200 can execute control plane functions through the one or more server computers 204. For example, the server computer 204 can execute a management component 210. A user can access the management component 210 to configure various aspects of the operation of the instances 206 purchased by the user. For example, the user can purchase, rent or lease instances and make changes to the configuration of the instances. The user can also specify settings regarding how the purchased instances are to be scaled in response to demand. The management component can further include a policy document to implement user policies. An auto scaling component 212 can scale the instances 206 based upon rules defined by the user. In one embodiment, the auto scaling component 212 allows a user to specify scale-up rules for use in determining when new instances should be instantiated and scale-down rules for use in determining when existing instances should be terminated. The auto scaling component 212 can consist of a number of subcomponents executing on different server computers 202 or other computing devices. The auto scaling component 212 can monitor available computing resources over an internal management network and modify resources available based on need.

A deployment component 214 can be used to assist users in the deployment of new instances 206 of computing resources. The deployment component can have access to account information associated with the instances, such as who is the owner of the account, credit card information, country of the owner, etc. The deployment component 214 can receive a configuration from a user that includes data describing how new instances 206 should be configured. For example, the configuration can specify one or more applications to be installed in new instances 206, provide scripts and/or other types of code to be executed for configuring new instances 206, provide cache logic specifying how an application cache should be prepared, and other types of information. The deployment component 214 can utilize the user-provided configuration and cache logic to configure, prime, and launch new instances 206. The configuration, cache logic, and other information may be specified by a user using the management component 210 or by providing this information directly to the deployment component 214. The instance manager can be considered part of the deployment component.

User account information 215 can include any desired information associated with a user of the multi-tenant environment. For example, the user account information can include a unique identifier for a user, a user address, billing information, licensing information, customization parameters for launching instances, scheduling information, auto-scaling parameters, previous IP addresses used to access the account, etc.

The server computer 204 can further include a manager 220 for managing the hardware/software/firmware 209A-209D. Returning briefly to the embodiment of FIG. 1, commands from the manager 220 within the control plane can be passed through the Ethernet interface 118 to the server computer 100. The commands can be in the form of APIs and can be received by logic 156 or logic 130 for storing configuration information for a protected mode 132 or an unprotected mode 174. The APIs can further manipulate the BARs 150 to either clear the BARs or program memory addresses into the BARs, depending on the mode.

A network 230 can be utilized to interconnect the server computers 202A-202D and the server computer 204. The network 230 can be a local area network (LAN) and can be connected to a Wide Area Network (WAN) 240 so that end users can access the compute service provider 200. It should be appreciated that the network topology illustrated in FIG. 2 has been simplified and that many more networks and networking devices can be utilized to interconnect the various computing systems disclosed herein.

Figure 3:
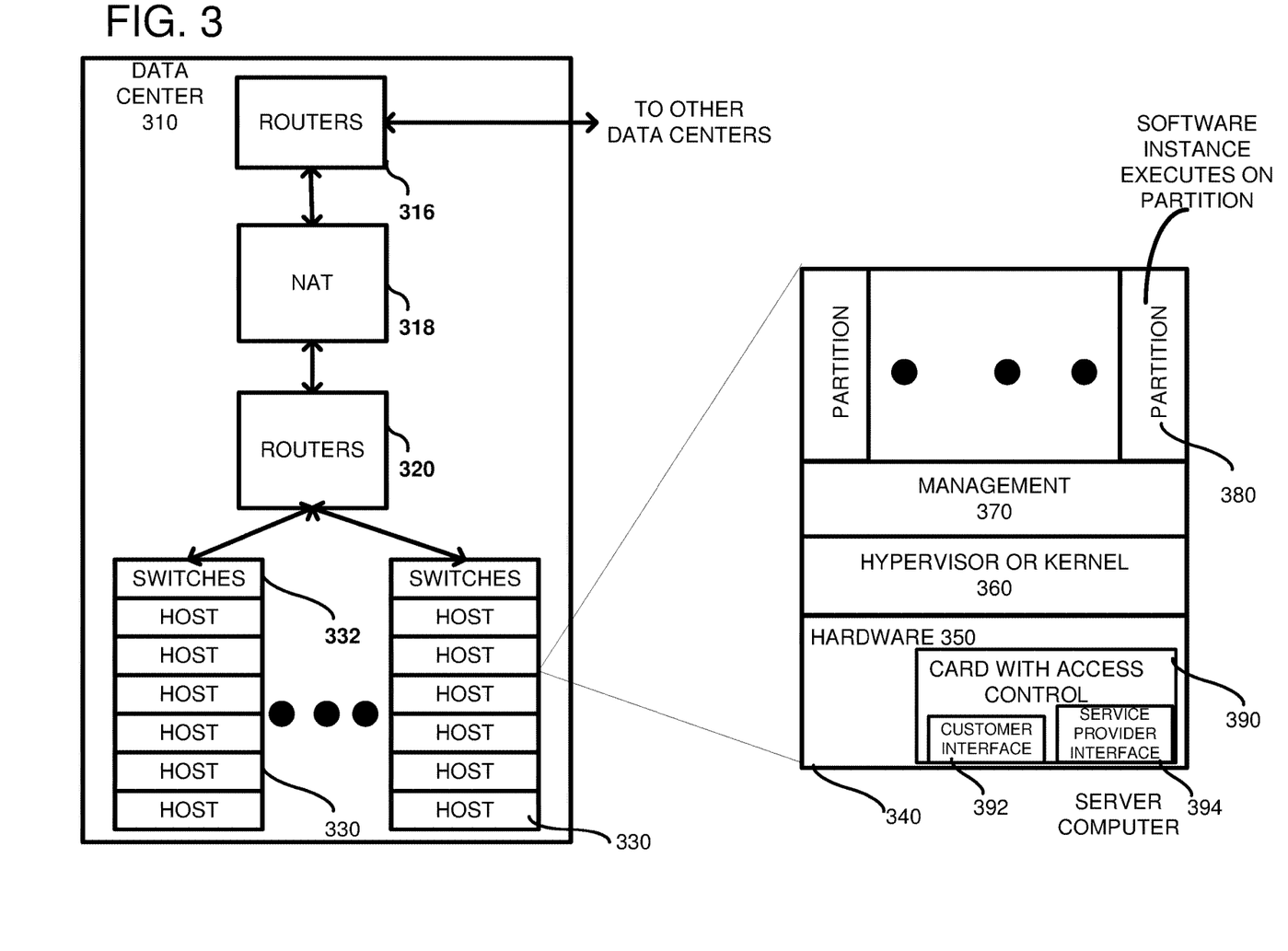
FIG. 3 shows an example of a plurality of host computers, routers and switches, which are hardware assets used for running virtual machine instances, wherein a card including access control is positioned within a server computer.

FIG. 3 illustrates physical hardware that can be within a data center associated with the compute service provider. The illustrated data center 310 includes a plurality of routers 316. The routers 316 read address information in a received packet and determine the packet's destination. If the router decides that a different data center contains a host server computer, then the packet is forwarded to that data center. If the packet is addressed to a host in the data center 310, then it is passed to a network address translator (NAT) 318 that converts the packet's public IP address to a private IP address. The NAT also translates private addresses to public addresses that are bound outside of the datacenter 310. Additional routers 320 can be coupled to the NAT to route packets to one or more racks 330 of host server computers. Each rack 330 can include a switch 332 coupled to multiple host server computers. A particular host server computer is shown in an expanded view at 340.

The host 340 has underlying hardware 350 including one or more CPUs, memory, storage devices, etc. Running a layer above the hardware 350 is a hypervisor or kernel layer 360. In some embodiments, the hypervisor can be removed. The hypervisor or kernel layer can be classified as a type 1 or type 2 hypervisor. A type 1 hypervisor runs directly on the host hardware 350 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX. Linux, etc., but other hypervisors can be used. A management layer 370 can be part of the hypervisor or separated therefrom and generally includes device drivers needed for accessing the hardware 350. The partitions 380 are logical units of isolation by the hypervisor. Each partition 380 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

The hardware 350 can include a card 390 with access control, such as has been described herein. As described above, other embodiments can be hardware/software/firmware integrated into the server computer, such as on the motherboard, so that a separate card is not required. The card 390 includes a first interface 392 and a second interface 394. The interfaces can be PCIe interfaces, Ethernet interfaces, or other interfaces, including, but not limited to, Industry Standard Architecture (ISA), Accelerated Graphics Port (AGP), Peripheral Component Interconnect (PCI), etc. Commands to these interfaces can either come from within the server computer 340 itself or from a control plane of the data center 310 (or another data center). An example of commands coming from the control plane include commands from manager 220 (FIG. 2). Although a single card 390 is shown, other cards can be added to the hardware 350. When the commands are received, the card can control access to the card's hardware.

Figure 4:
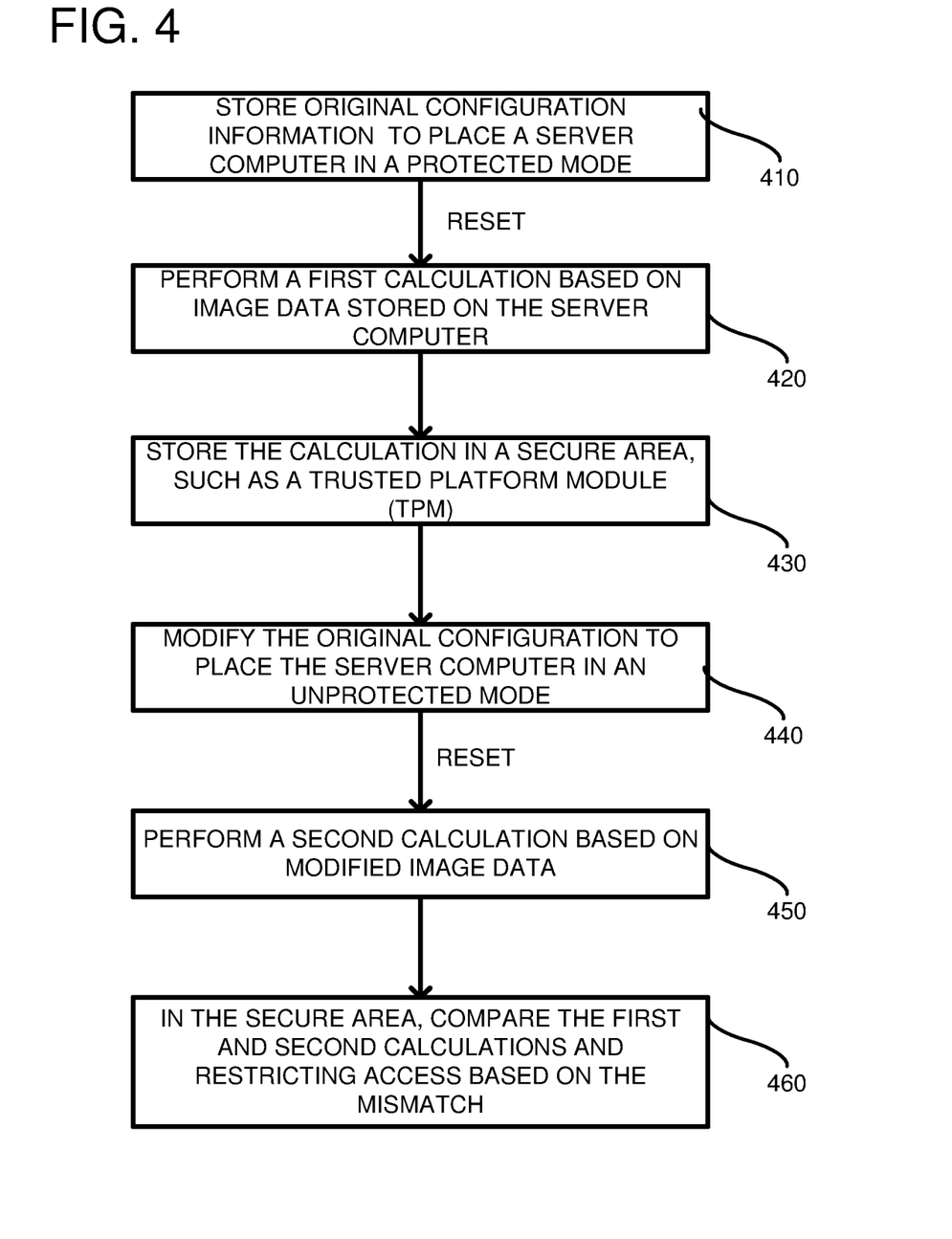
FIG. 4 is a flowchart of a method for controlling access to a server computer within the multi-tenant environment, wherein the server computer toggles from a protected mode to an unprotected mode.

FIG. 4 is a flowchart of a method for controlling a network interface access of hardware. In process block 410, original configuration information is stored on a server computer to place the server computer in a protected mode of operation, such as after powering on the server computer. In such a protected mode, access to encryption keys is available to a service provider interface (e.g., Ethernet), but access to configuration information is blocked to a user interface. After the original configuration information is stored, the server computer is automatically reset so that it will perform a staged boot load operation. In process block 420, a first calculation is performed based on image data stored on the server computer. The first calculation can be a hash function wherein image data is acquired from software and hardware on the server computer and entered into a hash function to compute a hash value. Additionally, as part of the image data, the configuration information is added to the hash function to compute the final hash value. Thus, each component of hardware and software can have a value associated therewith that is part of the image data for the card. In process block 430, a result of the first calculation is stored on the server computer in a secure area. As this is the original configuration information, the secure area will allow access to information stored within the secure area, such as encryption keys. In process block 440, the original configuration information is modified to place the server computer in an unprotected mode of operation. The modified configuration information is different from the original configuration information, which modifies the image data for the server computer. The BAR can also be programmed so as to enable memory access. The server computer is then reset so as to perform a new boot process. In process block 450, as part of the new boot process, a second calculation is performed based on the modified image data. In process block 460, the secure area, such as a TPM, compares the first and second calculations and restricts access to data within the secure area due to the mismatch there between. Thus, the user interface has access to configuration information due to programming of the BAR, but both the service provider and user interfaces are blocked from accessing the secure area due to the mismatch between the first calculation and the second calculation. In this way, users can access the configuration information for security updates, but cannot obtain access to encryption keys or other secure data, such as data that might identify ICs or other components used on the server computer.

Figure 5:
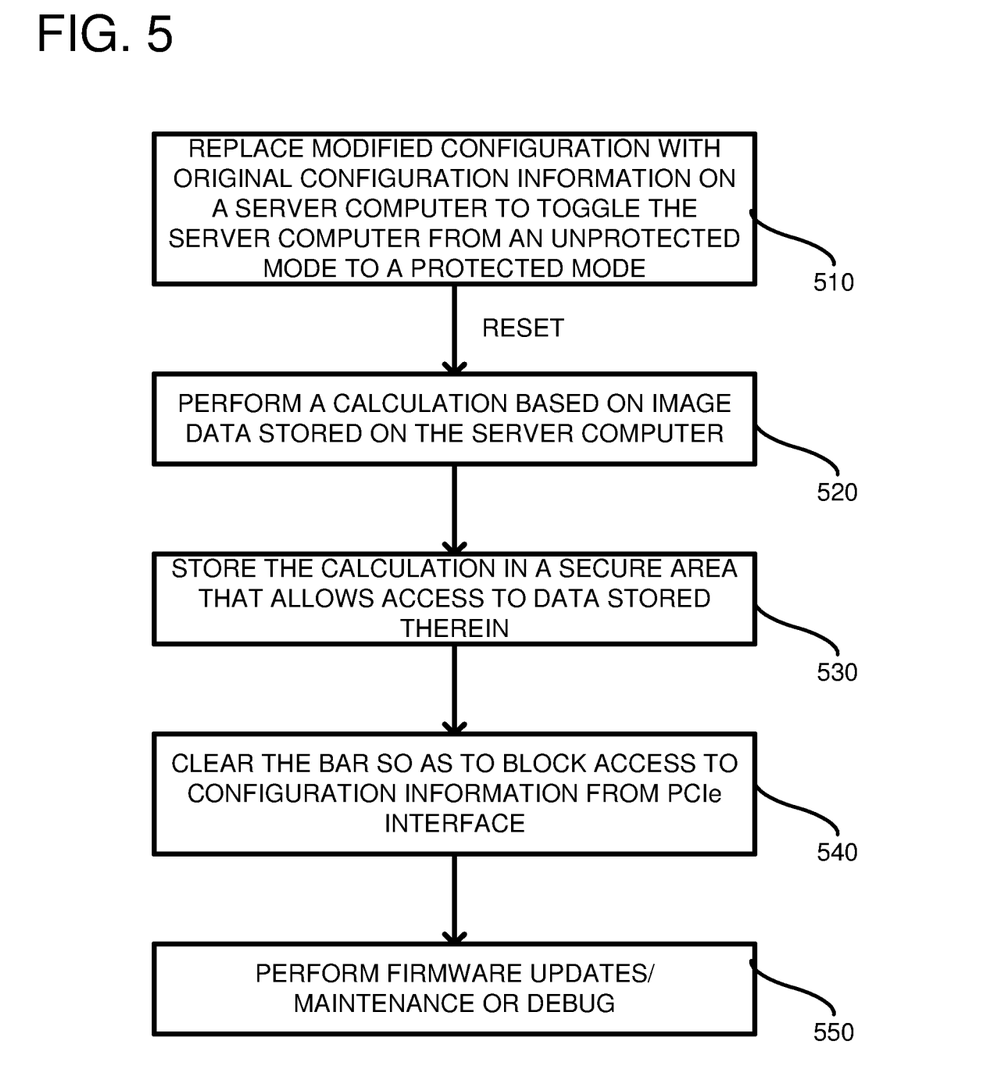
FIG. 5 is a flowchart of a method wherein the server computer of FIG. 4 toggles from the unprotected mode back to the protected mode.

FIG. 5 is a flowchart that extends FIG. 4 to toggle the server computer back from the unprotected mode to the protected mode. In process block 510, the modified configuration information is replaced with the original configuration information to toggle the server computer from the unprotected mode to a protected mode. Thus, the original configuration information from process block 410 (FIG. 4) is used again to return to the original mode. A reset is then performed so as to bring the server computer through a new boot process. In process block 520, a calculation is performed based on the new image data stored in the server computer. The new image data now includes the original configuration information rather than the modified configuration information. In process block 530, the resultant calculation is stored in the secure area and the secure area compares the stored original configuration information to the new calculation. Because the configuration information is the same as was originally computed, the secure area allows access to data stored therein. In process block 540, the BAR is cleared so as to prevent access to configuration information by the users through a user interface so as to block firmware updates. Thus, for example, the PCIe interface cannot access the configuration information due to the cleared BAR. In process block 550, the service provider logic can perform any desired firmware updates, maintenance, or debug. Typically such operations occur through the service provider interface. Thus, the server computer can be toggled back-and-forth between an unprotected and protected mode of operation as desired by the service provider and controlled either through an external control plane or a control plane within the server computer.

Figure 6:
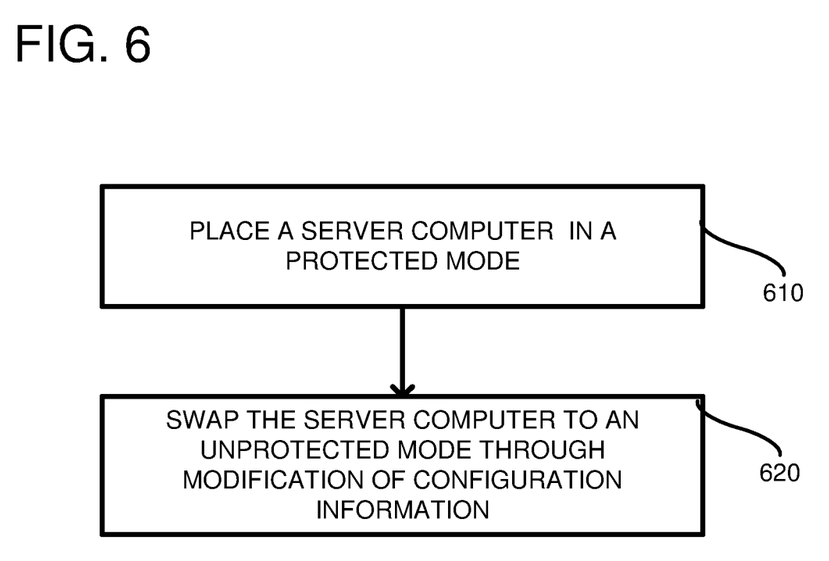
FIG. 6 is a flowchart of a method for controlling access to hardware and/or software on a server computer within the multi-tenant environment.

FIG. 6 is another embodiment for controlling access to hardware and software on a server computer. In process block 610, the server computer is reset to place the server in a protected mode. The server computer can also have an interface, such as a PCIe interface, blocked from accessing configuration information. In the protected mode, the secure area is available to the service provider so that the service provider can access keys (e.g., encrypted keys) within the secure area. For example, the service provider can send APIs through a separate interface than the PCIe interface, such as an Ethernet interface. The separate interface can use a different communication protocol than the PCIe interface. Additionally, the APIs can be generated by service provider logic on the server, or outside of the server, such as a control plane of the service provider, executing on separate server computers in a data center. In process block 620, the server computer is swapped or toggled to an unprotected mode of operation through modification of configuration information on the card. In the unprotected mode, the user interface has access to configuration information, but information within the TPM is blocked. Specifically, after the configuration information is modified, a reset can occur causing firmware to recalculate the modified image data, of which the configuration information is a part. The secure area can then compare the modified image data to the original image data stored in the secure area. A mismatch indicates an error condition to the secure area, which then blocks further access to data within the secure area, such as encrypted keys and other data. The modified configuration information can be received through the separate interface, rather than the interface used by users. Thus, the host can be in control of modifying the configuration information.

One advantage of having the server computer being swappable between a protected and an unprotected mode is that the hypervisor can be freed from blocking access to the server computer by users. Traditionally, the hypervisor is used to restrict access to hardware or software on the server computer, including cards plugged therein. However, in some applications it is desirable that the hypervisor executing on the server computer does not limit access to the hardware or software. In such cases, to maintain protection of hardware and software from users, it is desirable to have a card or the server computer itself, limit user access in a protected mode of operation. Moreover, by having two interfaces further protection is provided. For example, an Ethernet interface is not accessible to users of the service provider. Instead, the Ethernet interface is available only for host communications with the card or server computer. Through the Ethernet interface, the BAR can be programmed or cleared by sending an API request to service provider logic on the card or server computer that can perform such operations. Programming the BAR includes storing memory address offsets within the BAR, whereas clearing the BAR includes removing the memory offsets.

In some embodiments, the calculations are made on the image data using a hash function, but other functions can be used, such as checksums and other cryptographic functions. The inputs to the hash function are obtained by measuring values associated with hardware and/or software on the card or server computer and inputting the measured values into the hash function.

Figure 7:
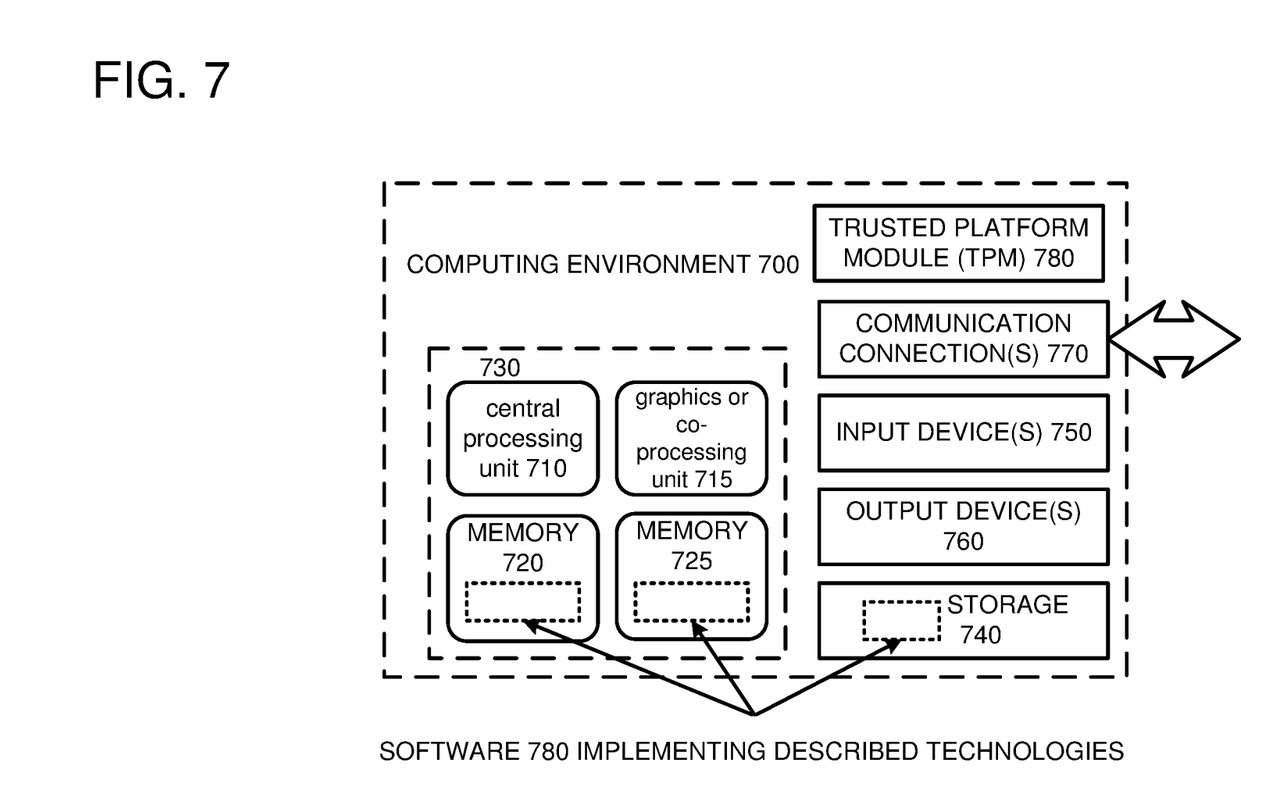
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770, such as network interfaces. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700. A TPM 780 can be positioned within the computing environment 700 and can perform the functionality described herein. Although a TPM is shown, other integrated circuits can be used to provide a secure area (also called a security vault).

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of controlling a network interface access, comprising:
   storing original configuration information on a card within a server computer of a service provider to place the server computer in a protected mode of operation, in which mode access to encryption keys is available to an Ethernet interface of the card, but access to the original configuration information, used for firmware updates on the card, is blocked to a Peripheral Component Interconnect Express (PCIe) interface of the card;
   as part of a first boot process after a reset of the card, performing a first calculation based on image data stored on the card;
   storing the first calculation on the card in a Trusted Platform Module (TPM);
   modifying the original configuration information on the card using the Ethernet interface to place the server computer in an unprotected mode of operation, in which mode the PCIe interface has access to the modified configuration information and wherein modifying the original configuration information modifies the image data;
   as part of a second boot process after a reset, performing a second calculation based on the modified image data; and
   in the TPM, comparing the first calculation to the second calculation and restricting access to the encryption keys in the TPM in the unprotected mode of operation as a result of a mismatch between the first calculation and second calculation to the Ethernet interface.

2. The method of claim 1, replacing the modified configuration information with the original configuration information so as to switch the card back to the protected mode, in which mode the PCIe interface is blocked from the original configuration information.

3. The method of claim 1, wherein the PCIe interface is the interface through which users of the server access the card.

4. The method of claim 3, wherein the Ethernet interface is not accessible to the users, but is accessible by the service provider to change the original and modified configuration information and toggle the card between the protected mode and the unprotected mode.

5. The method of claim 1, wherein the performing of the first calculation and the second calculation occurs using a hash function.

6. A computer-readable storage medium including instructions that upon execution cause a computer system to perform a method, comprising:
   placing a server computer in a protected mode, in which mode a first bus interface within the server computer is blocked from accessing configuration information and information within a secure area is available to a service provider via a second bus interface;
   calculating an original image data using the configuration information;
   storing the original image data in the secure area;
   modifying the configuration information;
   placing the server computer in an unprotected mode through the modification of the configuration information on the server computer, wherein in the unprotected mode, the first bus interface has access to the configuration information and the information within the secure area is blocked from availability via the second bus interface, wherein placing the server computer in the unprotected mode includes calculating a modified image data using the modified configuration data and comparing the modified image data to the original image data and blocking access to the secure area by the second bus interface when there is a mismatch between the modified image data and the original image data.

7. The computer-readable storage medium of claim 6, wherein the secure area is a Trusted Platform Module (TPM).

8. The computer-readable storage medium of claim 6, wherein the first bus interface is to a card within the server computer, wherein the server computer is within a service provider environment, wherein no hypervisor executing on the server computer limits user access to the card, and wherein the card limits user access in the protected mode.

9. The computer-readable storage medium of claim 8, wherein the first bus interface is a PCIe interface coupled to the card, wherein the second bus interface is an Ethernet interface coupled to the card, and wherein the Ethernet interface is not accessible to the user.

10. The computer-readable storage medium of claim 6, wherein the method further comprises:
    calculating an image associated with hardware and software on the server computer using a function after a reset; and
    receiving the modification of the configuration information through the second bus interface, different than the first bus interface.

11. The computer-readable storage medium of claim 10, wherein the calculating the image includes determining a first hash value by measuring values associated with the hardware and software on the server computer and inputting the measured values into a hash function.

12. The computer-readable storage medium of claim 6, wherein the method further comprises:
    clearing Base Address Registers (BARs) to block the accessing of the configuration information.

13. The computer-readable storage medium of claim 6, wherein the method further comprises:
    replacing the modified configuration with the configuration information before the modification;
    resetting the server computer to return the server computer to the protected mode.

14. The computer-readable storage of claim 13, wherein the method further comprises:
performing firmware updates on the server computer while the server computer is in the protected mode.

15. A system, comprising:
a server computer within a service provider environment;
a first bus interface within the server computer;
a second bus interface within the server computer;
a secure area within the server computer; and
service provider logic coupled to the second bus interface and the secure area, the service provider logic configured to toggle the server computer between a protected mode, wherein the first bus interface does not have access to configuration information and the second bus interface has access to the secure area, and an unprotected mode, wherein the first bus interface does have access to the configuration information and the second bus interface does not have access to data within the secure area, wherein the secure area is a Trusted Platform Module (TPM), wherein the configuration information is stored on a card within the server computer, the configuration information being a first configuration information used in calculating an image for the card that is stored in the TPM, and wherein a second configuration information is used to calculate a different image so that the TPM blocks access to data stored therein.

16. The system of claim 15, wherein the first bus interface is a Peripheral Component Interconnect Express (PCIe) interface and the second bus interface is an Ethernet interface.

17. The system of claim 15, wherein the service provider logic programs a Base Address Register (BAR) so as to allow the user interface to access the configuration information or clears the BAR to prevent a user from accessing the configuration information.

18. The system of claim 15, wherein the second bus interface is not accessible by the user.

19. The system of claim 15, wherein in the protected mode, an identifier of a component within the server computer is not accessible.

* * * * *